United States Patent
Carminati et al.

(10) Patent No.: US 12,173,829 B2
(45) Date of Patent: Dec. 24, 2024

(54) PIPELINE RELINING

(71) Applicant: ENI S.P.A., Rome (IT)

(72) Inventors: Stefano Carminati, San Donato Milanese (IT); Massimo Zampato, Venice (IT); Stefano Mauro, Turin (IT); Leonardo Sabatino Scimmi, Todi (IT)

(73) Assignee: ENI S.P.A., Rome (IT)

( * ) Notice: Subject to any disclaimer, the term of this patent is extended or adjusted under 35 U.S.C. 154(b) by 0 days.

(21) Appl. No.: 17/769,479

(22) PCT Filed: Oct. 16, 2020

(86) PCT No.: PCT/IB2020/059769
§ 371 (c)(1),
(2) Date: Apr. 15, 2022

(87) PCT Pub. No.: WO2021/074883
PCT Pub. Date: Apr. 22, 2021

(65) Prior Publication Data
US 2024/0133503 A1    Apr. 25, 2024
US 2024/0230009 A9    Jul. 11, 2024

(30) Foreign Application Priority Data
Oct. 18, 2019   (IT) .......................... 102019000019277

(51) Int. Cl.
| | | |
|---|---|---|
| F16L 55/165 | (2006.01) |
| F16L 55/32 | (2006.01) |
| B29C 35/08 | (2006.01) |
| B29C 63/36 | (2006.01) |
| F16L 101/18 | (2006.01) |

(52) U.S. Cl.
CPC ....... *F16L 55/1651* (2013.01); *F16L 55/1653* (2013.01); *F16L 55/32* (2013.01); *B29C 2035/0827* (2013.01); *B29C 63/36* (2013.01); *F16L 2101/18* (2013.01)

(58) Field of Classification Search
CPC .......................... F16L 55/1651; F16L 55/1653
See application file for complete search history.

(56) References Cited

U.S. PATENT DOCUMENTS

| | | | |
|---|---|---|---|
| 4,685,983 A | 8/1987 | Long, Jr. | |
| 4,776,370 A * | 10/1988 | Long, Jr. | ............. F16L 55/1651 138/109 |

FOREIGN PATENT DOCUMENTS

| | | |
|---|---|---|
| EP | 1810814 A1 | 7/2007 |
| KR | 20170089754 A | 8/2017 |

OTHER PUBLICATIONS

International Search Report dated Jan. 13, 2021 for PCT Appl. No. PCT/IB2020/059769.

(Continued)

*Primary Examiner* — Jeffry H Aftergut
(74) *Attorney, Agent, or Firm* — Ruggiero McAllister & McMahon LLC

(57) ABSTRACT

A process and system for applying a liner to an inner surface of a pipeline uses an "inversion" technique to apply the liner. This involves arranging the liner into everted and non-everted portions and driving the non-everted portion through the pipeline such that it everts and is applied to the inner surface of the pipeline. At least first and second pipeline vehicles are used to drive the non-everted portion of the liner through the pipeline.

12 Claims, 8 Drawing Sheets

(56) References Cited

OTHER PUBLICATIONS

Written Opinion Report dated Jan. 13, 2021 for PCT Appl. No. PCT/IB2020/059769.

* cited by examiner

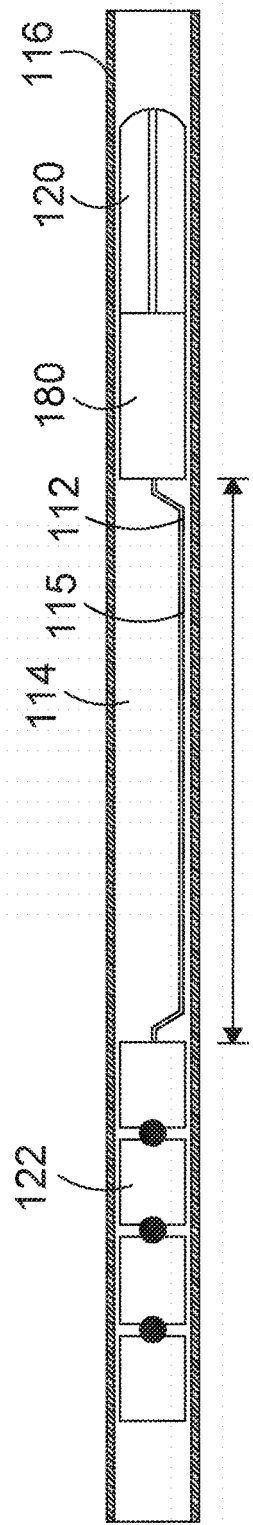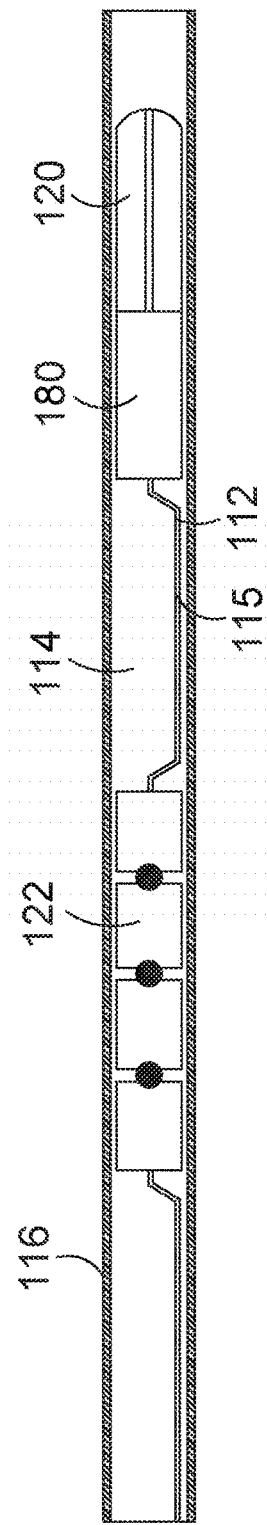
FIG. 7A
FIG. 7B

PIPELINE RELINING

CROSS-REFERENCE TO RELATED APPLICATIONS

This Patent Application is a national stage application, filed under 35 U.S.C. § 371 of International Patent Application No. PCT/IB2020/059769, filed on Oct. 16, 2020, which claims priority from Italian Patent Application No. 102019000019277 filed on Oct. 18, 2019, the entire disclosure of each of which is incorporated herein by reference.

BACKGROUND OF THE DISCLOSURE

1. Field of the Disclosure

This disclosure relates to methods and systems for relining a pipeline. Described herein is a process and system for applying a liner to an inner surface of a pipeline. Also described is a pipeline vehicle for use in the system for applying a liner to an inner surface of the pipeline.

2. Description of Related Art

It is known in the field of pipeline intervention to fix a leaking pipeline by applying a liner to the inner surface of the leaking pipeline to stop the leak. It is known to use a liner delivery system to apply the liner to the inner surface of the pipeline. Such a system is described in U.S. Pat. No. 4,064,211. In this system, the liner is arranged into everted and non-everted portions, and delivered using a delivery tube having an inlet and an outlet. The non-everted portion of the liner is arranged within the delivery tube, and the everted portion is folded over the outlet portion of the delivery tube and fixed to the delivery tube such that any fluid that flows out of the outlet of the delivery tube contacts the liner.

When fluid contacts the liner it drives the liner away from the delivery tube and causes the liner to evert where the non-everted portion meets the everted portion. The liner projecting from the delivery tube can then be inserted into the pipeline which has a leak and driven along the length of the pipeline by injecting fluid into the inlet of the delivery tube. The outer surface of the liner (the surface of the liner that contacts the inner surface of the pipeline when the liner is applied to the pipe) is provided with a resin that sets after a period of time. Therefore, after the liner is driven along the length of the pipeline and the resin has set, the leak may be repaired.

The problem with these prior systems is that there is a limit to the length of pipeline, which can be repaired by using them. This limit is associated with the existence of friction between the non-everted portion of the liner and the inner wall of the pipeline which has had the everted portion of the liner applied thereto.

The total friction between the inner wall of the pipeline and the non-everted portion of the liner within the pipeline increases proportionately to the mass of the non-everted portion of the liner located within the pipeline and, therefore, proportionately to the length of the non-everted portion of the liner located within the pipeline. At the same time, the maximum force that can be applied to the end of the liner fixed to the delivery tube is limited by the mechanical strength of the material used to form the liner. Hence, a limit exists on the length of liner, which can be applied to the inner surface of a pipeline using the technique described in US'211.

It is the object of the present disclosure to overcome at least one problem with prior systems/methods for relining pipes with the objective, for example, to restore them.

SUMMARY OF THE DISCLOSURE

According to a first aspect of the present disclosure, there is provided a process for applying a liner to an inner surface of a pipeline, the process comprising the steps of:
 i) providing first and second pipeline vehicles, an anchor member and the liner, the liner being an elongate flexible liner;
 ii) arranging the liner such that:
  the liner comprises everted and non-everted portions and the everted portion is fixed to the anchor member, and
  the non-everted portion extends through respective first and second passages of the first and second pipeline vehicles and the everted portion is folded over a leading portion of the first pipeline vehicle;
 iii) driving the first pipeline vehicle through the pipeline away from the anchor member and second pipeline vehicle such that the non-everted portion is pulled towards the leading portion of the first pipeline vehicle by the first pipeline vehicle and applied to the inner surface of the pipe;
 iv) clamping a first portion of the non-everted portion of the liner with the second clamping component of the second pipeline vehicle a distance behind the first pipeline vehicle;
 v) driving the second pipeline vehicle towards the first pipeline vehicle through the pipe; and
 vi) driving the first pipeline vehicle away from the second pipeline vehicle further into the pipeline.

The second pipeline vehicle may comprise a second pipeline vehicle passage which defines a portion of the second passage. The second pipeline vehicle passage may comprise means for selectively altering the length of the second pipeline vehicle passage. The process may further comprise accumulating liner within the second pipeline vehicle passage by increasing the length of the second pipeline vehicle passage.

The first pipeline vehicle may comprise a UV emitting component. The process may further comprise emitting UV radiation onto liner, which has been applied to the inner surface of the pipeline using the UV emitting component.

Step i) may further comprise providing a third pipeline vehicle having a third passage extending therethrough, wherein the third passage is for the liner. The third pipeline vehicle may comprise a UV emitting component. Step ii) may involve arranging the liner such that the non-everted portion extends through the first, second, and third passages. The process may further comprise driving the third pipeline vehicle through the pipeline behind the first pipeline vehicle and emitting UV radiation onto liner, which has been applied to the inner surface of the pipeline using the UV emitting component.

Step i) may further comprise providing a fourth pipeline vehicle, wherein the fourth pipeline vehicle comprises a fourth passage extending therethrough, and the fourth passage is for the liner. The fourth pipeline vehicle may comprise a fourth clamping component. Step ii) may involve arranging the liner such that the non-everted portion extends through the first, second, and fourth passages, and the process may further comprise the steps of:

s clamping a second portion of the non-everted portion of the liner with the fourth clamping component a distance behind the second pipeline vehicle;

driving the fourth pipeline vehicle towards the second pipeline vehicle through the pipe; and driving the second pipeline vehicle away from the fourth pipeline vehicle further into the pipeline.

The first or second pipeline vehicle may comprise an impregnating agent dispensing component, and the process may further comprise the step of dispensing impregnating agent onto liner, which has been applied to the inner surface of the pipeline.

According to a second aspect of the present disclosure, there is provided a system for applying a liner to an inner surface of a pipeline, comprising:

a first pipeline vehicle having:
   a first passage extending therethrough, the first passage being for the liner and comprising an inlet and an outlet, and
   a guide surface arranged to direct a first portion of the liner passing through the outlet onto the inner surface of the pipe; and
a second pipeline vehicle having a second passage extending therethrough, the second passage being for the liner,
wherein the second pipeline vehicle comprises a second clamping component arranged to clamp a second portion of the liner when the liner is located in the second passage.

The pipeline vehicle may comprise a pipeline vehicle part that defines a portion of the passage. The second pipeline vehicle part may comprise means for selectively altering the length of the portion of the passage.

The system may further comprise a third pipeline vehicle having a third passage extending therethrough. The third passage may be for the liner, and the first or third pipeline vehicle may comprise a UV emitting component arranged to emit UV radiation onto an inner surface of the pipeline which has had liner applied thereto.

Each of the first and second pipeline vehicles may comprise a plurality of movable modules which together define their respective passages. The plurality of movable modules may be connected by way of at least one joint which allows passage of the liner therethrough.

The system may further comprise: a controller in communication with each of the first and second pipeline vehicles, the controller being configured to control the operation of the first and second pipeline vehicles. The first pipeline vehicle may comprise a first position sensor operable to measure a position of the first pipeline vehicle. The second pipeline vehicle may comprise a second position sensor operable to measure a position of the second pipeline vehicle. The controller may be operable to control the second pipeline vehicle, based upon signals from the first and second position sensors, such that, in use, the second clamping component clamps the second portion of the liner, and the second pipeline vehicle is driven towards the first pipeline vehicle.

The first or second pipeline vehicle may comprise an impregnating agent dispensing component arranged to dispense impregnating agent onto the liner applied to the inner surface of the pipeline.

According to a third aspect of the present disclosure, there is provided a pipeline vehicle for use with the system of the second aspect, comprising:

a passage extending through the vehicle, the passage being for the liner; and a clamping component arranged to clamp a portion of the liner when the liner is located in the passage.

The second pipeline vehicle may comprise a second pipeline vehicle passage which defines a portion of the second passage. The second pipeline vehicle passage may comprise means for selectively altering the length of the second pipeline vehicle passage.

BRIEF DESCRIPTION OF THE DRAWINGS

Preferred embodiments of the present disclosure will now be described, by way of example only, with reference to the accompanying drawings, in which:

FIGS. 7A to 7D show sequential steps in a method of applying a liner to an inner surface of a pipeline using the system of FIG. 2.

DETAILED DESCRIPTION OF THE DISCLOSURE

Figure 1:
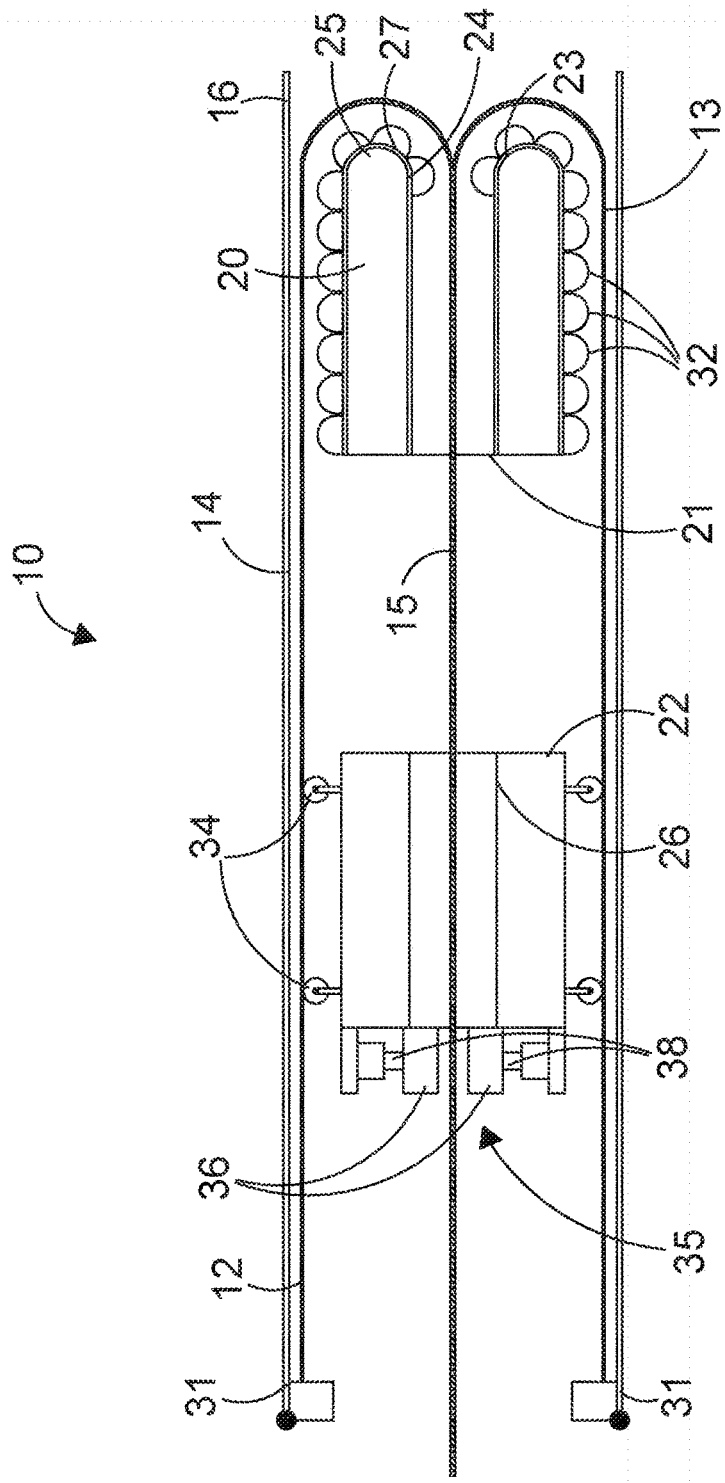
FIG. 1 shows a system for applying a liner to an inner surface of a pipeline according to a first embodiment of the present disclosure.

With reference to FIG. 1, there is shown a system 10 for applying a liner 12 to an inner surface 14 of a pipeline 16. The system 10 uses the so called "inversion" technique to apply the liner 12 to the inner surface 14 of the pipeline 16. This involves arranging the liner 12 into everted and non-everted portions 13, 15 and driving the non-everted portion through the pipeline such that it everts and is applied to the inner surface of the pipeline 16.

In the system 10 of the present disclosure, at least first and second pipeline vehicles 20, 22 are used to drive the non-everted portion 15 of the liner through the pipeline 16. As shown, the first pipeline vehicle 20 comprises a first passage 24 extending therethrough. Similarly, the second pipeline vehicle 22 includes a second passage 26 extending therethrough. Each of the first and second passages 24, 26 are for the liner to pass through in use in the manner shown in FIG. 1. The first passage 24 has an inlet 21 and an outlet 23, and a leading portion 25 of the first pipeline vehicle 20 comprises a guide surface 27 which is arranged to direct liner passing through the outlet of the first passage onto the inner surface of the pipeline.

In the depicted example, the first pipeline vehicle 20 is movable through the pipeline 16 by way of a plurality of spheres 32 mounted upon the first pipeline vehicle 20. As shown, the spheres 32 are provided upon the guide surface 27 and are spaced apart along the length of the first pipeline vehicle 20. The spheres 32 not only serve to move the first pipeline vehicle 20 through the pipeline but also to press liner, which has been applied to the inner surface of the pipeline 16 as the first pipeline vehicle passes over it. The spheres 32 also encourage the liner to evert as the liner passes from the outlet 23 of the first passage onto the guide surface 27.

In the depicted example, the second pipeline 22 vehicle is movable through the pipeline by way of a plurality of wheels 34 which it is mounted upon. These wheels 34 may be driven by a second pipeline vehicle motor (not shown). As shown, the second pipeline vehicle 22 includes a second clamping component 35. The second clamping component 35 is arranged to clamp a portion of the liner 12 when the liner is located in the second passage 26. In the depicted example, the second clamping component 35 comprises a pair of clamping jaws 36 which are movable by way of hydraulic pistons 38.

In FIG. 1, the liner 12 is a tubular flexible liner. As shown, in FIG. 1 the liner 12 is arranged such that the non-everted portion 15 of the liner extends through the first and second passages 24, 26. Further, the everted portion 13 of the liner is arranged such that it is folded over the guide surface 27 of the leading portion 25 of the first pipeline vehicle 20 and fixed to an anchor member 31. In this way, as the first pipeline vehicle 20 moves through the pipeline 16, liner 12 is applied to its inner surface 14.

Figure 2:
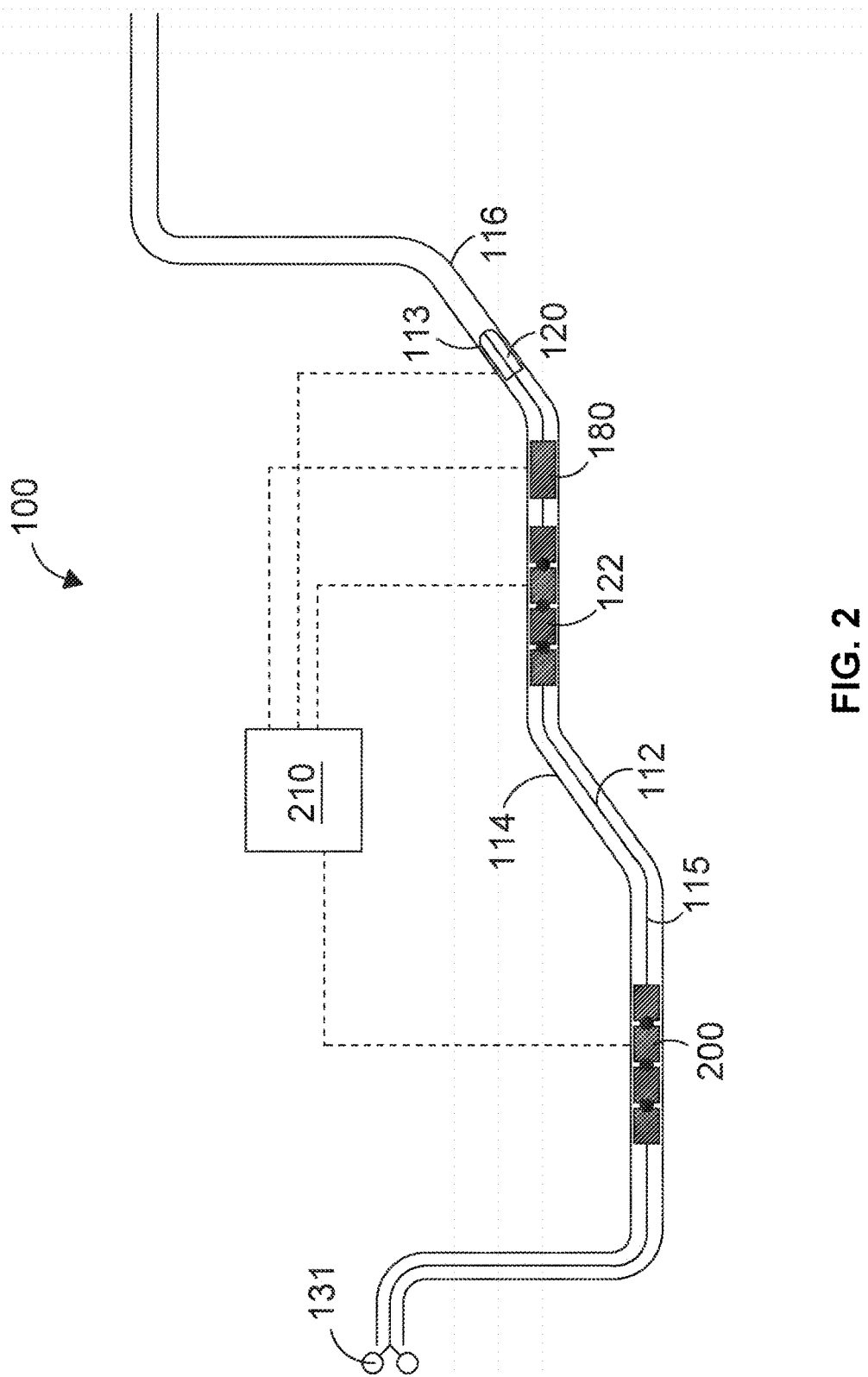
FIG. 2 is a schematic diagram of a system for applying a liner to an inner surface of a pipeline according to a second embodiment of the present disclosure.

With reference to FIG. 2, there is shown a system 100 for applying a liner 112 to an inner surface 114 of the pipeline 116 according to a second preferred embodiment of the present disclosure. Like the system 10 of the first embodiment the system 100 of the second embodiment comprises first and second pipeline vehicles 120, 122. However, in the second embodiment, there are four pipeline vehicles 120, 122, 180, 200 in total. Specifically, in addition to the first and second pipeline vehicles 120, 122 of the first embodiment, there are third and fourth pipeline vehicles 180, 200. Each of these vehicles will be described in detail below. Each of the pipeline vehicles 120, 122, 200 described below is shown with liner located within its respective passage in its respective figure.

As shown in FIG. 2, each of the pipeline vehicles, 120, 122, 180, 200 is in communication with a controller 210. The pipeline vehicles are in communication with the controller 210 such that the controller can control the operation of the pipeline vehicles. Each of the pipeline vehicles 120, 122, 180, 200 may include a position sensor (not shown) operable to measure a position of the pipeline vehicle within the pipeline. Each of the pipeline vehicles 120, 122, 180, 200 may be in communication with the controller 210 such that they are able to convey signals from their respective position sensors to the controller. The controller 210 may be configured to control the position of each of these pipeline vehicles based on signals from the position sensors.

Figure 3:
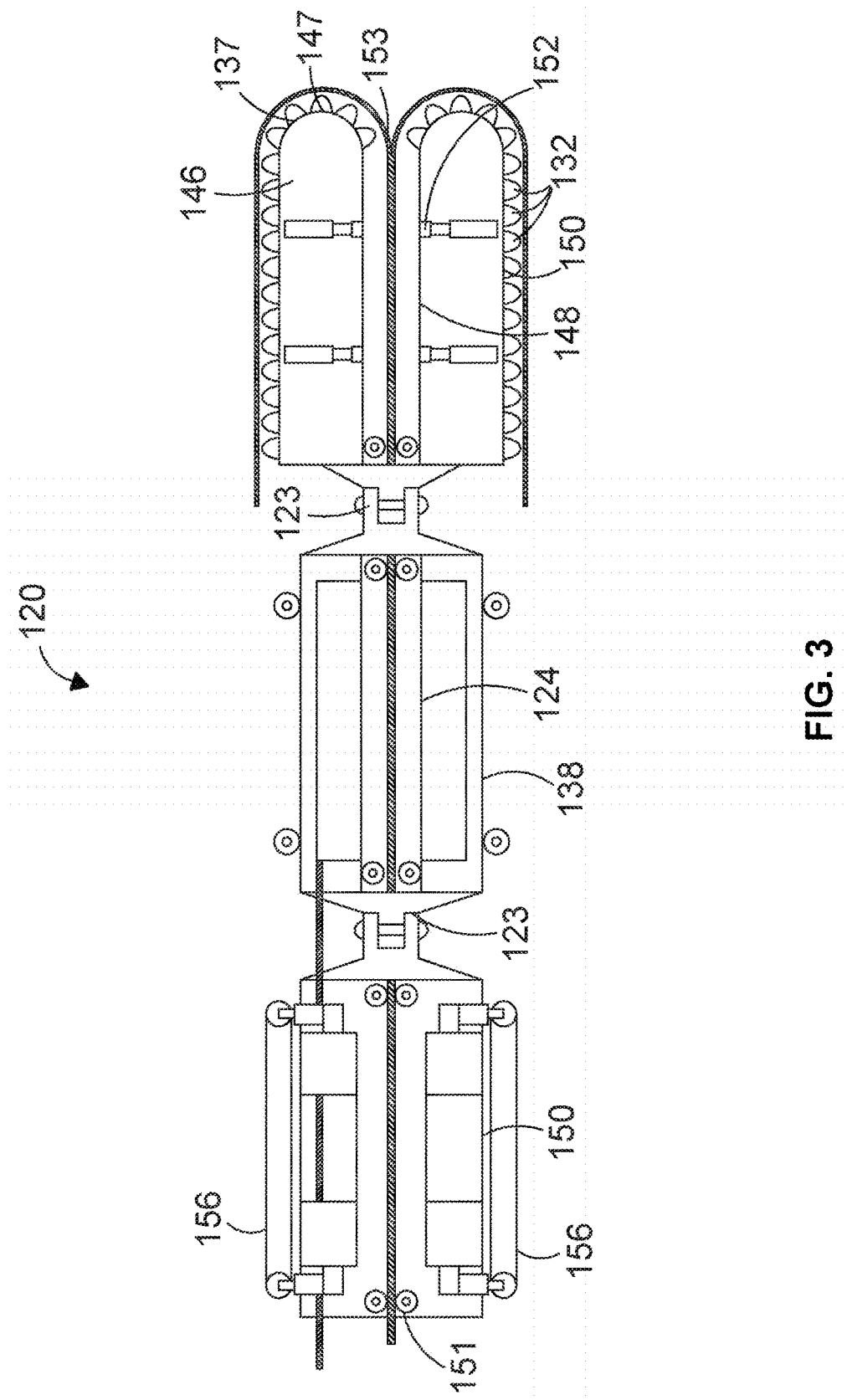
FIG. 3 shows a first pipeline vehicle for use in the system of FIG. 2.

With reference to FIG. 3, there is shown a first pipeline vehicle 120 in accordance with the second embodiment. As shown, the first pipeline vehicle 120 comprises a first plurality of movable modules 146, 138, 150 which together define the first passage 124 for the liner. The first plurality of movable modules 146, 138, 150 are connected by way of joints 123 which allow the passage of the liner therethrough. The specific joint 123 employed is described in greater detail below.

The first plurality of movable modules 146, 138, 150 of the first pipeline vehicle comprises an everter module 146, a first storage module 138 and a first drive module 150. In the depicted example, the drive module 150 comprises the inlet 151 of the first passage and the everter module 146 comprises the outlet 153 of the first passage 124.

The first pipeline vehicle 120 is arranged to be the leading pipeline vehicle of the system as the pipeline vehicles of the system 100 move through the pipeline. The everter module 146 is arranged to be the leading module of the first pipeline vehicle. As such, the everter module 146 comprises a leading portion 147 which comprises a guide surface 137 arranged to direct liner onto the inner surface of the pipeline as liner passes through the outlet 153 of the first passage 124.

The everter module 146 is movable through the pipeline by way of a plurality of spheres 132 mounted upon the everter module. As shown, the spheres 132 are provided upon the guide surface 137 and are spaced apart along the length of the everter module 146. The spheres 132 not only serve to allow the first pipeline vehicle 120 to move through the pipeline but also to press liner, which has been applied to the inner surface of the pipeline as the everter module 146 passes over it. The spheres also further encourage the liner to evert as the liner passes from the outlet 153 of the first passage 124 onto the guide surface 137.

The everter module 146 comprises inner and outer body sections 148, 150. The inner body section 148 defines the portion of the first passage defined by the everter module, and the outer body section 150 has mounted thereto the spheres 132. An arrangement of springs 152 is provided between the inner and outer body sections 148, 150. Each of the springs 152 is fixed to each of the inner and outer body sections 148, 150. The arrangement of springs 152 acts to urge the outer body section 150 outwards in a radial direction so as to enable the everter module 146 to adapt passively to the dimensions of the effective cross section of the pipeline.

The first drive module 150 is the module that provides the driving force required to move the first pipeline vehicle 120 through the pipeline in use and comprises a motor and driveable movement means 156, which are arranged to be driven by the motor, and in the depicted example are a plurality of driven belts. Alternatively, a plurality of driven wheels may be employed.

The first storage module 138 may store any necessary operating equipment for the motor of the first drive module 150. It may also store communication devices that allow the first pipeline vehicle 120 to communicate with the controller 210, and fluid required for hydraulic actuators, if such actuators are employed in the system 100. The storage module 138 may also store impregnating agent.

The first pipeline vehicle 120 may comprise an impregnating agent dispensing component (not shown). The impregnating agent dispensing component may be operable to dispense impregnating agent onto liner that has been applied to the inner surface of the pipeline.

Figure 4:
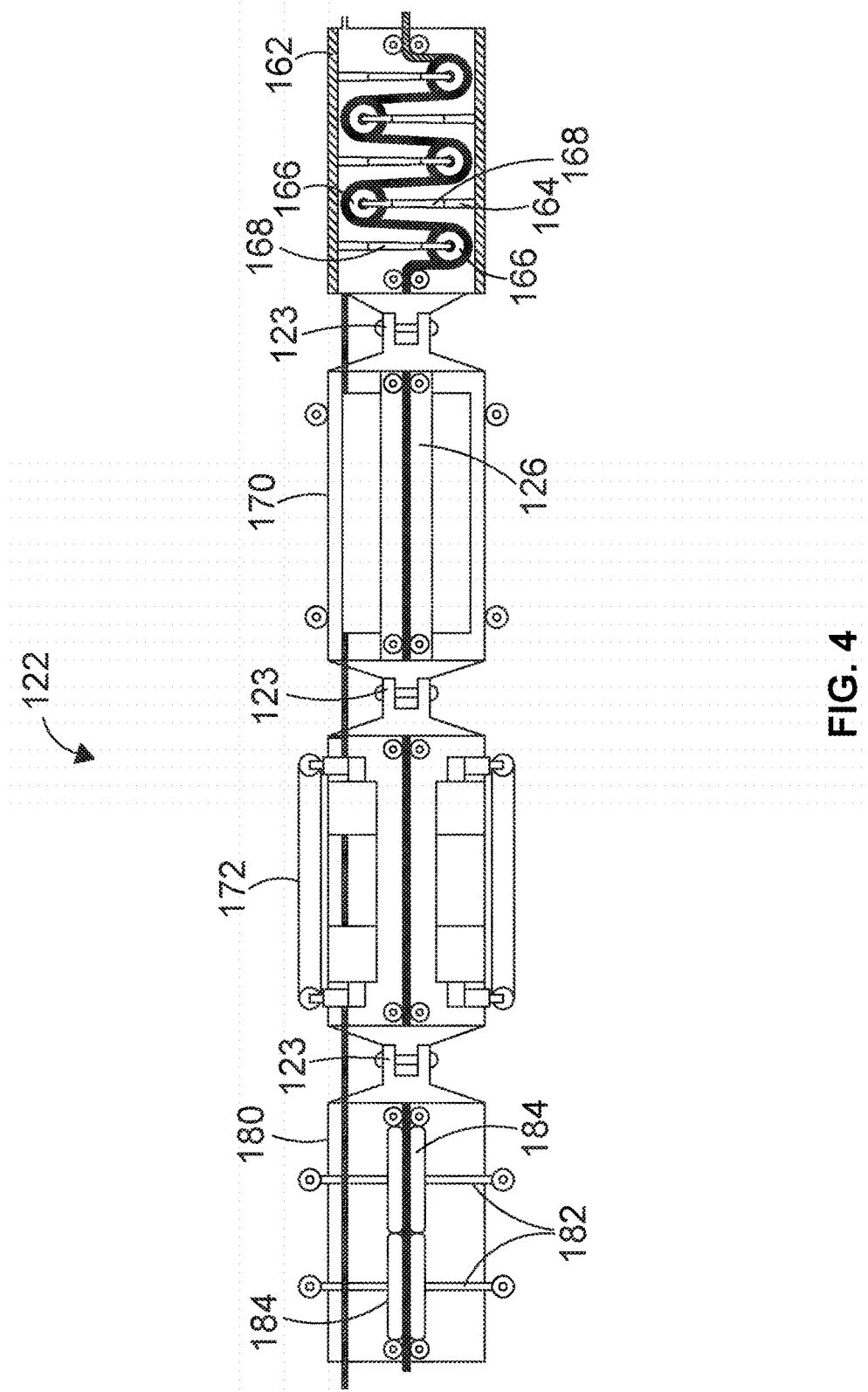
FIG. 4 shows a second pipeline vehicle for use in the system of FIG. 2.

With reference to FIG. 4, there is shown a second pipeline vehicle 122 in accordance with the second embodiment of the present disclosure. As shown, the second pipeline vehicle comprises a second plurality of movable modules 162, 170, 172, 211 which together define the second passage 126 for the liner. The second plurality of movable modules 162, 170, 172, 211 are connected by way of the joint 123 described with respect to the first pipeline vehicle 120 of the second embodiment. The second plurality of movable modules 162, 170, 172, 211 of the second pipeline vehicle comprises an accumulator module 162, a second storage module 170, a second drive module 172, and a clamping module 211. In the depicted example, the clamping module 211 comprises the inlet of the second passage 126, and the accumulator module 162 comprises the outlet of the second passage.

The clamping module 211 comprises a pair of clamps 213 which are arranged to clamp a portion of the liner located in the portion of the passage defined by the clamping module. In the depicted example, each clamp 213 comprises a pair of spring-loaded jaws 215, which may be selectively moved between clamping and non-clamping positions by way of an actuation mechanism. The actuation mechanism may, in turn, be controlled by the controller.

The accumulator module 162 comprises an accumulator module passage 164 which is a portion of the second passage 126. The accumulator module passage 164 is convoluted. The accumulator module passage 164 comprises a means for selectively altering the length of the accumulator module passage 164. This means that in use, the length of the accumulator module passage 164 may be altered, and therefore, the length of liner within the accumulator module passage may be altered also. In the depicted example, the means for selectively altering the length of the accumulator passage comprises a plurality of legs 168 which have a selectively adjustable length. A free end of each leg has a roller 166 mounted thereto, which in use, the liner extends around.

The second storage module 170 has substantially the same construction as the first storage module 138 of the first pipeline vehicle 120. Further, the second drive module 172 has substantially the same construction as the first drive module 150 of the first pipeline vehicle 120.

The second 122 and fourth 200 pipeline vehicles have the same features.

Figure 5:
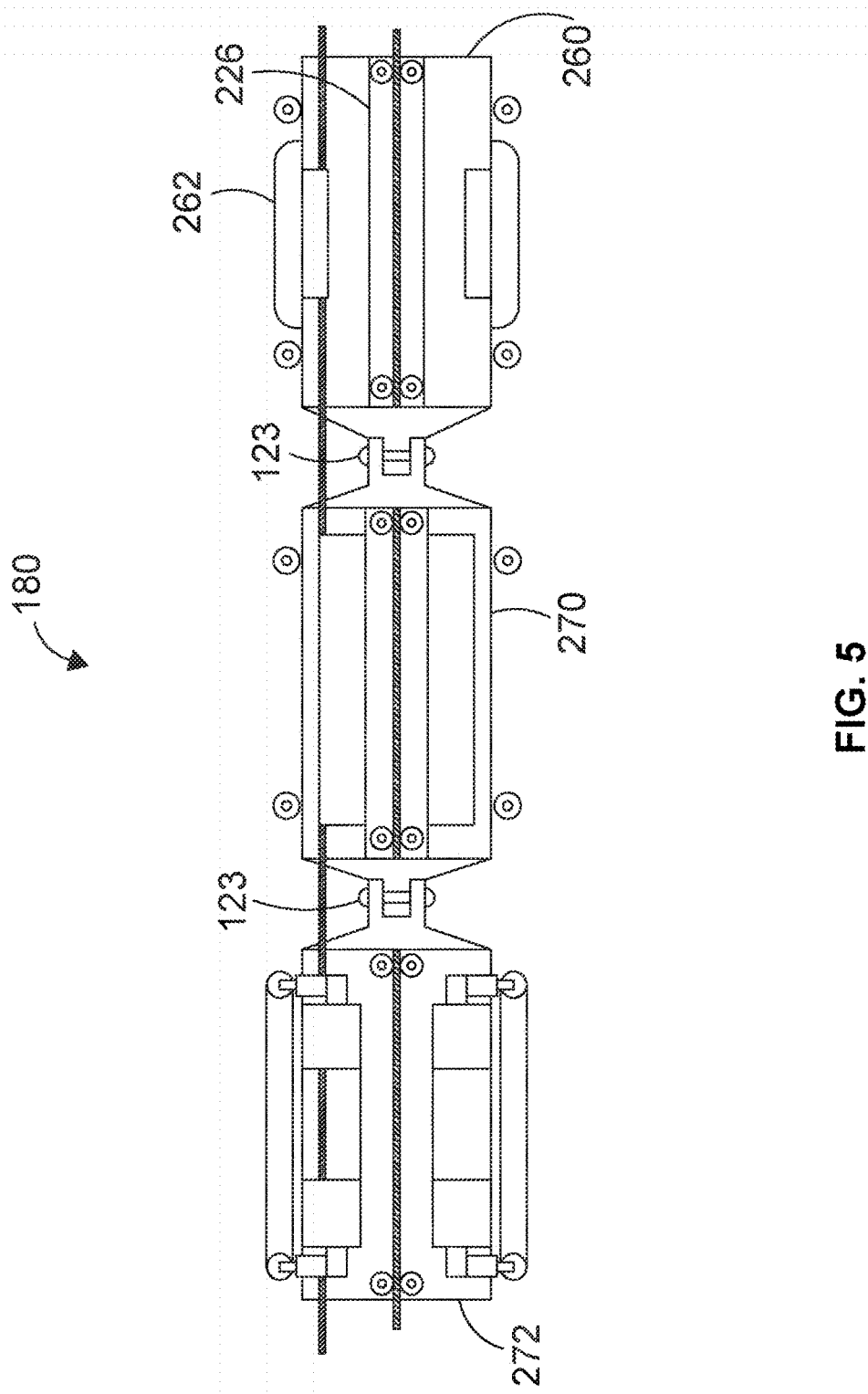
FIG. 5 shows a third pipeline vehicle for use in the system of FIG. 2.

With reference to FIG. 5, there is shown a third pipeline vehicle 180 in accordance with the second embodiment of the system of the present disclosure. As shown, the third pipeline vehicle 180 comprises a third plurality of movable modules 270, 272, 260, which together define the third passage 226 for the liner. The third plurality of movable modules 270, 272, 260 are connected by way of the joint 123 described with respect to the first pipeline vehicle 120 of the second embodiment. The third plurality of movable modules 270, 272, 260 of the third pipeline vehicle comprises a third storage module 270, a third drive module 272 and a UV emission module 260. In the depicted example, the third drive module 272 comprises the inlet of the third passage 226, and the UV emission module 260 comprises the outlet of the third passage.

The third storage module 270 has substantially the same construction as the first storage module 138 of the first pipeline vehicle 120. Further, the third drive module 272 has substantially the same construction as the first drive module 150 of the first pipeline vehicle.

The UV emission module 260 comprises a UV emitting component 262. The UV emitting component 262 is arranged to emit UV radiation onto liner which has been applied to the inner surface of the pipeline in use. In the depicted example, the UV emitting component 262 is a UV lamp provided on an outer surface of the UV emission module.

Figure 6:
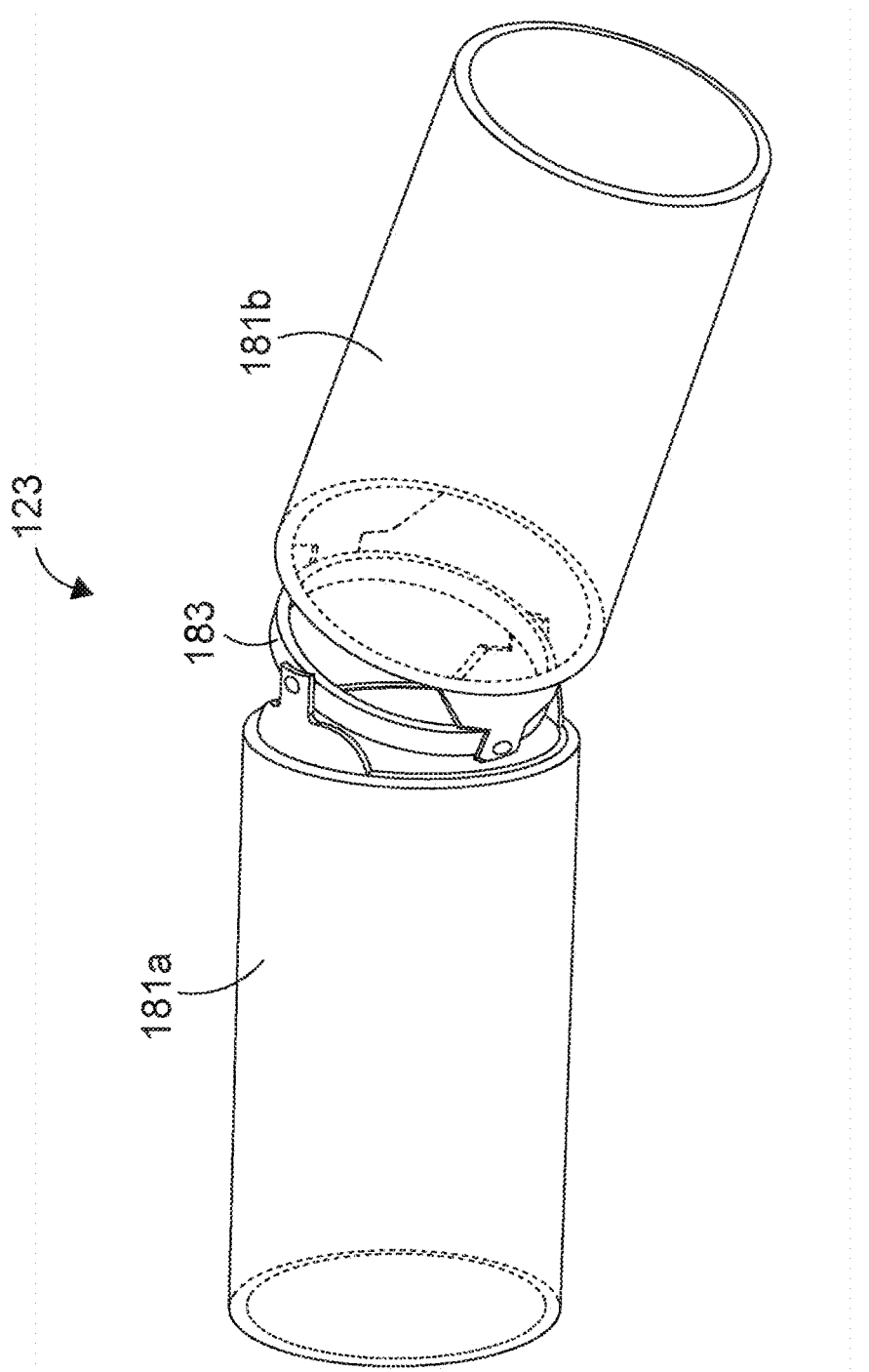
FIG. 6 shows a universal joint for use in the vehicles of FIGS. 3, 4 and 5.

With reference to FIG. 6, there is shown the universal joint 123 which is used to connect modules of the pipeline vehicles described above. As shown, first and second portions 181a, 181b of connected modules are rotatably mounted upon an intermediate ring 183 of circular geometry which allows the liner, power cables and/or fluid conduits to pass through it. Each of the first and second portions 181a, 181b are rotatably/pivotably connected to the ring 183 at two points, where an axis of rotation extends through those two points. The axis of rotation of the pair of connecting points of the first portion 181a is substantially perpendicular to the axis of rotation of the pair of points of the second portion 181b.

With reference to FIG. 1, how the system 10 of FIG. 1 may be used to apply liner 12 to an inner surface 14 of a pipeline 16 will now be described.

First of all, the liner 12 is located in the first and second passages of the first and second pipeline vehicles 20, 22. The liner 12 is then arranged into everted and non-everted portions 13, 15. The everted portion 13 is folded over the guide surface 27 of the leading portion 25 of the first pipeline vehicle 20 and fixed to an anchor member 31. The anchor member 31 could be a portion of the pipeline 16 located at the inlet end of the pipeline or, alternatively, an object of a significant weight not located in the pipeline. The aforementioned step is referred to as the "liner arranging stage" below.

The first pipeline vehicle 20 is then driven into the pipeline 16 away from the anchor member 31 and the second pipeline vehicle 22. This has the effect of pulling a first portion of the non-everted portion 15 of the liner towards the guide surface 27 of the first pipeline vehicle 20 where it is everted and applied to the inner surface of the pipeline 16. The second pipeline vehicle 22 then enters the pipeline 16. Once the first pipeline vehicle 20 is located a predetermined distance away from the second pipeline vehicle 22 within the pipeline 16, the second pipeline vehicle clamps a second portion of the non-everted portion 15 of the liner using the second clamping component 35. This has the effect of "segmenting" the liner 12.

The second pipeline vehicle 22 is then driven further into the pipeline 16 towards the first pipeline vehicle 20. This has the effect of creating "slack" in the portion of the non-everted portion 15 of the liner 12 located between the first and second pipeline vehicles 20, 22.

The second clamping component 35 is then disengaged such that it no longer clamps the second portion of the non-everted portion of the liner. The first pipeline vehicle 20 is then driven further into the pipeline 16 to apply more of the non-everted portion 15 of the liner to the inner surface 14 of the pipeline until the non-everted portion of the liner has been applied to the inner surface of the pipeline in its entirety. The first and second pipeline vehicles 20, 22 are then driven out of the pipeline 16.

With reference to FIGS. 7A to 7D, how the system 100 of FIG. 2 may be used to apply the liner 112 to the inner surface 114 of a pipeline 116 will now be described. The liner 112 used is preferably a polymer-preimpregnated fibre fabric.

First of all, the liner 112 is arranged with respect to the pipeline vehicles 120, 122, 180, 200 in a similar way to the liner arranging stage in accordance with the use of the system 10 of the first embodiment described above. However, the non-everted portion of the liner 112 is arranged such that it extends through the respective passages of the first, second, third, and fourth pipeline vehicles 120, 122, 180, 200. The pipeline vehicles 120, 122, 180, 200 are arranged such that the first pipeline vehicle 120 is the first pipeline vehicle to enter the pipeline, followed by the third pipeline vehicle 180, which is followed by the second pipeline vehicle 122, which in turn is followed by the fourth pipeline vehicle 200.

The first pipeline vehicle 120 is driven into the pipeline so as to apply liner to the inner surface 114 of the pipeline 116 in the same way as described in connection with the use of the system 10 of the first embodiment. However, if the first pipeline vehicle 120 comprises the impregnating agent dispensing component, impregnating agent may be dispensed onto liner 112 which has been applied to the inner surface 114 of the pipeline 116 using the impregnating agent dispensing component.

The controller 210 controls the relative positions of each of the pipeline vehicles 120, 122, 180, 200 based upon signals from their respective position sensors as the pipeline vehicles move through the pipeline 116. The controller 210 controls the third pipeline vehicle 180 such that it is located close behind the first pipeline vehicle 120 and emits UV radiation onto liner applied to the inner surface of the pipeline by using the UV emitting component 262. This has the effect of polymerising the liner 112 applied to the inner surface 114 of the pipeline 116, thereby fixing it in position.

The controller 210 controls the position of the second and third pipeline vehicles 122, 180 such that the second pipeline vehicle is located a distance behind the third pipeline vehicle, as depicted in FIG. 7A. As the first 120 and third 180 pipeline vehicles move through the pipeline 116 the distance between the second 122 and third 180 pipeline vehicles increases.

When the distance reaches 1000 m or so, the controller 210 controls the first 120 and third 180 pipeline vehicles such that they slow or stop. The controller 210 then controls the second clamping component of the second pipeline vehicle 122 such that it clamps a portion of the non-everted portion of the liner. The controller 210 then controls the second pipeline vehicle 122 such that the second pipeline vehicle is driven towards the first 120 and third 180 pipeline vehicles to close the distance between the second pipeline vehicle 122 and the third pipeline vehicle 180, as shown in FIG. 7B. As the distance is closed, "slack" is created in the non-everted portion 115 of the liner 112. Concurrently, as the distance is closed, the accumulating module of the second pipeline vehicle 122 may be employed to store liner within the accumulator module passage by altering the length of the accumulating module passage using the means for altering the length of the accumulating module passage.

Figures 7C, 7D:
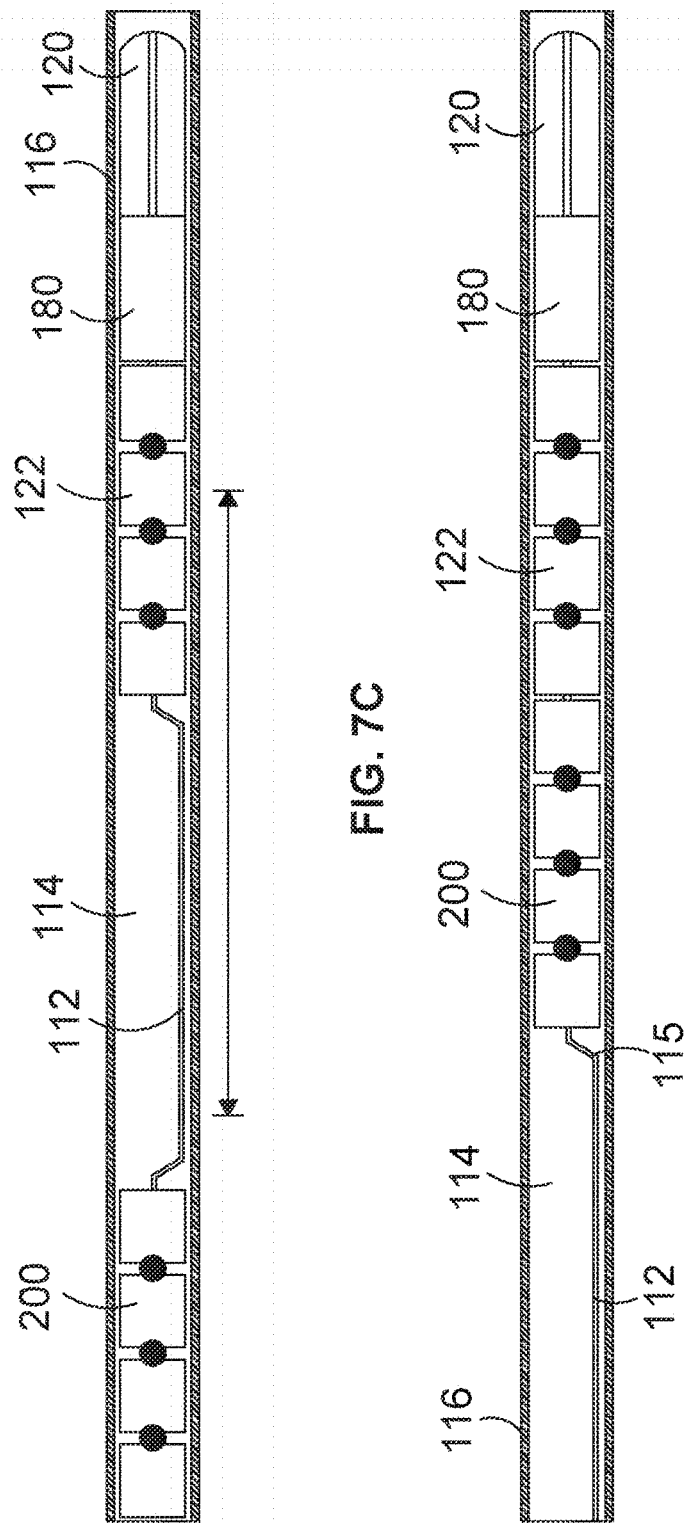

Similarly, the controller 210 controls the position of the fourth pipeline vehicle 200 such that it is located a distance behind the second pipeline vehicle 122 as the pipeline vehicles 120, 122, 180, 200 move through the pipeline 116. When the distance reaches 1000 m or so, the controller 210 controls the fourth clamping component of the fourth pipeline vehicle 200 such that it clamps a portion of the non-everted portion of the liner 112. The controller 210 then controls the fourth pipeline vehicle 200 such that the fourth pipeline vehicle 200 is driven towards the second pipeline vehicle 122 to close the distance between the second and fourth pipeline vehicles, as shown in FIG. 7C.

The accumulating module of the fourth pipeline vehicle 200 may be employed in a similar way to the way the accumulating module of the second pipeline vehicle 122 is employed as described above. Once, this operation is complete, as shown in FIG. 7D, the controller 210 controls the second and fourth pipeline vehicles 122, 200 such that the second and fourth clamping components are disengaged such that they no longer clamp their respective portions of the non-everted portion 115 of the liner 112. The controller 210 then controls the first 120 and third 180 pipeline vehicles such that they are driven away from the second 122 and fourth 200 pipeline vehicles such that the non-everted portion 115 of the liner 112 is applied to the inner surface 114 of the pipeline in its entirety.

In the present disclosure, the friction between the inner wall of the pipeline and the non-everted portion of the liner as it moves towards the outlet of the first passage is reduced because the non-everted portion of the liner is arranged into sections which are carried by separated pipeline vehicles. If enough separated pipeline vehicles are used effectively any length of liner may be applied to the inner surface of a pipeline. Furthermore, in the present disclosure, the structural integrity of the non-everted portion of the liner is maintained as it moves towards the outlet of the first passage because the non-everted portion of the liner does not "rub" against the inner wall of the pipeline like in prior arrangements.

In the present disclosure, abrasion between the non-everted portion and the everted portion of the liner that has been applied to the pipeline is reduced. Furthermore, less stress is applied to the liner during the relining process with respect to prior arrangements. This means that in contrast to prior arrangements:

1) There is no requirement to provide a specific layer on the non-everted portion of the liner to combat abrasion. Furthermore, a simple friction reducer may be applied to the non-everted portion of the liner to make the relining process easier; and
2) the liner itself may be lighter.

The consequence of 1) is that both time and money are saved. The consequence of 2) is the relining process is easier, and money is saved. Polymer-preimpregnated fibre fabric cannot polymerise in the presence of a liquid. Therefore, as the present disclosure does not require the use of pressurised liquid like prior arrangements a liner comprising polymer-preimpregnated fibre fabric can be used with the system.

The specific pipeline vehicle with the clamping module described herein allows the non-everted portion of the liner to be divided into the sections mentioned above.

In the present disclosure, the liner is applied to the inner surface by arranging the liner into everted and non-everted portions. "Everted" in this patent specification means turned inside out. "Non-everted" in this patent specification means not turned inside out. The everted portion is therefore turned inside out with respect to the non-everted portion.

"Pipeline vehicle" means a "pig" or member that is movable through the pipeline. Each of the pipeline vehicles described herein are arranged such that they may be driven independently of each other. In other words, each of the pipeline vehicles may be moved through the pipeline independently of the other pipeline vehicles. Each of the pipeline vehicles described herein may be self-propelled. In other words, each pipeline vehicle may comprise a motor, which drives drivable movement means. Alternatively, an arrangement comprising one or more motors, cable, and one or more winches may be employed.

The anchor member may be a portion of the pipeline located at the inlet end of the pipeline. Alternatively, the anchor member may be a heavy weight located out with the pipeline.

The distances of 1000 m mentioned above are not essential. The distances could be shorter or longer than 1000 m.

The total number of pipeline vehicles used depends on the length of the pipeline to be repaired. Preferably, a pipeline vehicle is provided every 500 m-2000 m, and most preferably every 1000 m.

Each pipeline vehicle may have a passage for a cable for data transmission and electric power supply. The passage may include a means to obtain a kinematic separation between parts of the cable that link the pipeline vehicle to the next pipeline vehicle along the length of the pipe. This means may be similar to the one described to separate the various portions of liner between a pipeline vehicle from the next pipeline vehicle.

Each vehicle may have a power source. This power source may be a battery. Modifications and improvements may be incorporated without departing from the scope of the disclosure, which is defined by the appended claims.

The invention claimed is:

1. A process for applying a liner to an inner surface of a pipeline, the process comprising the steps of:
   i) providing first and second pipeline vehicles, an anchor member and the liner, the liner being an elongate flexible liner;
   ii) arranging the liner so that:
      the liner comprises everted and non-everted portions and the everted portion is fixed to the anchor member, and
      the non-everted portion extends through respective first and second passages of the first and second pipeline vehicles and the everted portion is folded over a leading portion of the first pipeline vehicle;
   iii) driving the first pipeline vehicle through the pipeline away from the anchor member and second pipeline vehicle so that the non-everted portion is pulled towards the leading portion of the first pipeline vehicle by the first pipeline vehicle and applied to the inner surface of the pipeline;
   iv) clamping a first portion of the non-everted portion of the liner with a second clamping component of the second pipeline vehicle a distance behind the first pipeline vehicle;
   v) driving the second pipeline vehicle towards the first pipeline vehicle through the pipeline; and
   vi) driving the first pipeline vehicle away from the second pipeline vehicle further into the pipeline.

2. The process of claim 1, further comprising:
   accumulating liner within a second pipeline vehicle passage by increasing a length of the second pipeline vehicle passage,
   wherein the second pipeline vehicle comprises the second pipeline vehicle passage which defines a portion of the second passage, and
   wherein the second pipeline vehicle passage comprises means for selectively altering the length of the second pipeline vehicle passage.

3. The process of claim 1, further comprising:
   emitting UV radiation onto liner which has been applied to the inner surface of the pipeline using a UV emitting component,
   wherein the first pipeline vehicle comprises the UV emitting component.

4. The process of claim 1, wherein step i) further comprises providing a third pipeline vehicle having a third passage extending therethrough,
   wherein the third passage is for the liner, wherein the third pipeline vehicle comprises a UV emitting component,
   wherein step ii) involves arranging the liner such that the non-everted portion extends through the first, second and third passages, and
   wherein the process further comprises driving the third pipeline vehicle through the pipeline behind the first pipeline vehicle and emitting UV radiation onto liner which has been applied to the inner surface of the pipeline using the UV emitting component.

5. The process of claim 1,
   wherein step i) further comprises providing a fourth pipeline vehicle, wherein the fourth pipeline vehicle comprises a fourth passage extending therethrough,
   wherein the fourth passage is for the liner, wherein the fourth pipeline vehicle comprises a fourth clamping component, wherein step ii) involves arranging the liner such that the non-everted portion extends through the first, second and fourth passages, and the process further comprises the steps of:
   clamping a second portion of the non-everted portion of the liner with the fourth clamping component a distance behind the second pipeline vehicle;
   driving the fourth pipeline vehicle towards the second pipeline vehicle through the pipeline; and
   driving the second pipeline vehicle away from the fourth pipeline vehicle further into the pipeline.

6. The process of claim 1, further comprising the step of:
   dispensing impregnating agent with an impregnating agent dispensing component onto liner which has been applied to the inner surface of the pipeline,
   wherein the first or second pipeline vehicle comprises the impregnating agent dispensing component.

7. A system for applying a liner to an inner surface of a pipeline, comprising:
   a first pipeline vehicle having:
      a first passage extending therethrough, the first passage being for the liner and comprising an inlet and an outlet, and
      a guide surface arranged to direct a first portion of the liner passing through the outlet onto the inner surface of the pipeline; and
   a second pipeline vehicle having a second passage extending therethrough, the second passage being for the liner,
      wherein the second pipeline vehicle comprises a second clamping component arranged to clamp a second portion of the liner when the liner is located in the second passage.

8. The system of claim 7, wherein the second pipeline vehicle comprises a pipeline vehicle part which defines a portion of the second passage, and wherein the pipeline vehicle part comprises means for selectively altering a length of the portion of the second passage.

9. The system of claim 7, further comprising a third pipeline vehicle having a third passage extending therethrough, wherein the third passage is for the liner, and wherein the first or third pipeline vehicle comprises a UV emitting component arranged to emit UV radiation onto an inner surface of the pipeline which has had liner applied thereto.

10. The system of claim 7, wherein each of the first and second pipeline vehicles comprises a plurality of movable modules which together define their respective passages, and wherein the plurality of movable modules are connected by way of at least one joint which allows passage of the liner therethrough.

11. The system of claim 7, wherein the system comprises:
   a controller in communication with each of the first and second pipeline vehicles, the controller being configured to control operation of the first and second pipeline vehicles,
   wherein the first pipeline vehicle comprises a first position sensor operable to measure a position of the first pipeline vehicle,
   wherein the second pipeline vehicle comprises a second position sensor operable to measure a position of the second pipeline vehicle; and
   wherein the controller is operable to control the second pipeline vehicle, based upon signals from the first and second position sensors, such that, in use, the second clamping component clamps the second portion of the liner and the second pipeline vehicle is driven towards the first pipeline vehicle.

12. The system of claim 7, wherein the first or second pipeline vehicle comprises an impregnating agent dispensing component arranged to dispense impregnating agent onto the liner applied to the inner surface of the pipeline.

* * * * *